Figure 1:
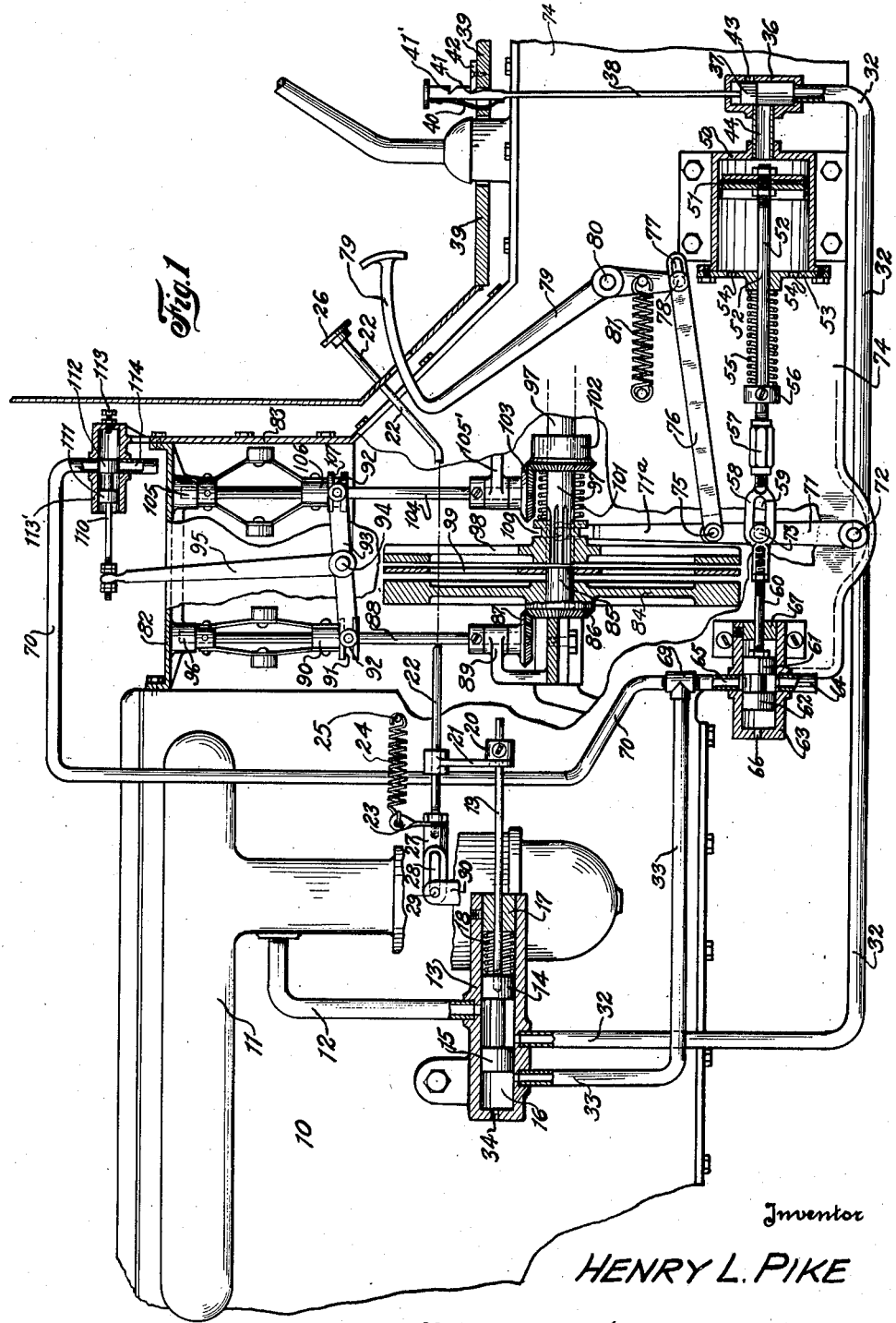

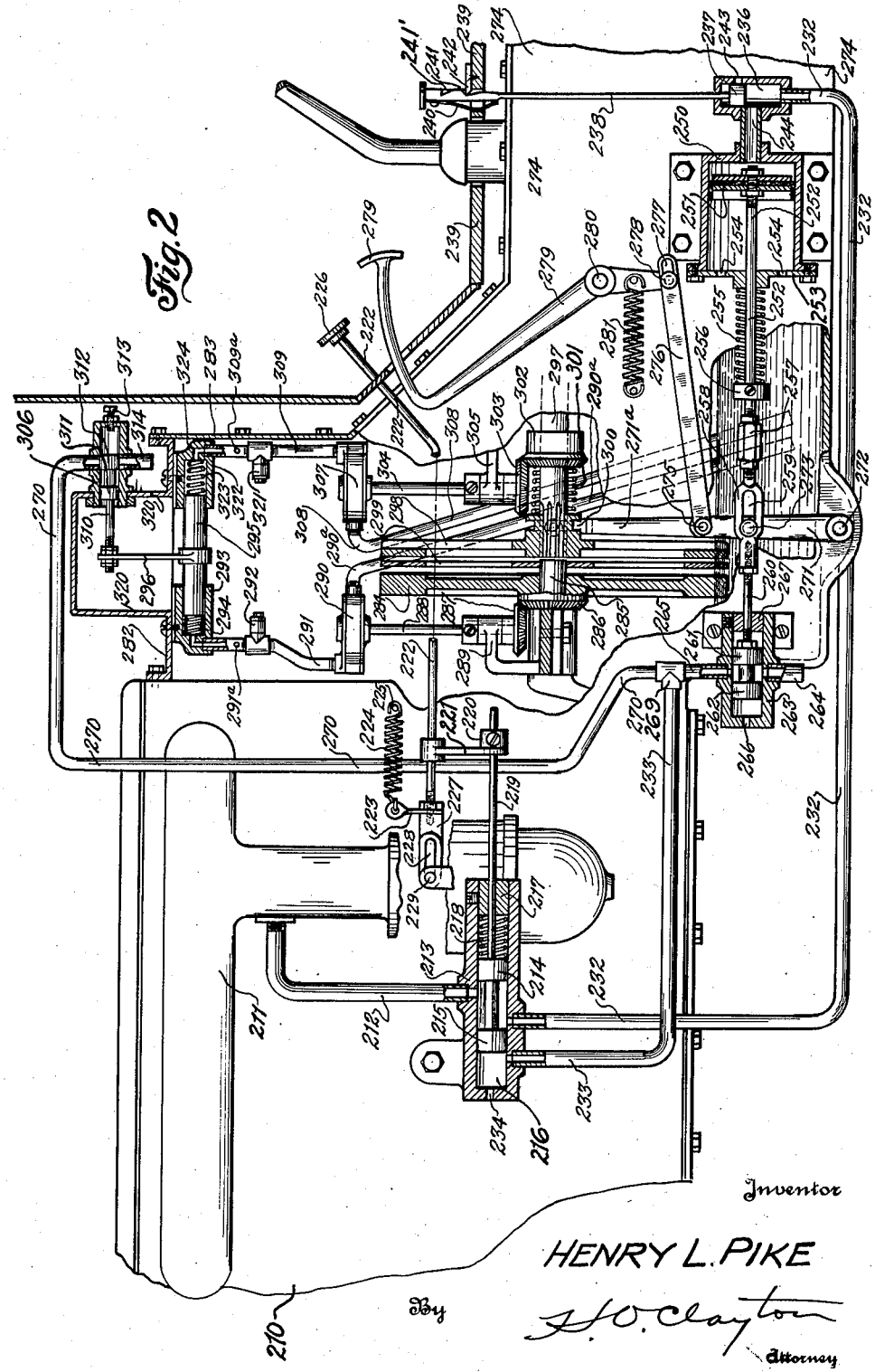

Patented Mar. 8, 1938

2,110,675

UNITED STATES PATENT OFFICE 2,110,675

AUTOMATIC CLUTCH OPERATING MEANS

Henry L. Pike, Greensboro, N. C., assignor to Bragg-Kliesrath Corporation, South Bend, Ind., a corporation of New York Application March 5, 1934, Serial No. 713,965

10 Claims. (Cl. 192—.01)

This invention relates to automatic clutch operating means for an automotive clutch wherein means are provided for controlling the mechanism for operating the clutch, so that the clutch cannot be brought to engaging position unless the driving and driven elements of the clutch are moving at the same or approximately the same speed.

Various forms of automatic clutch control mechanisms have been provided such as the means disclosed in my co-pending applications, Serial No. 515,886, filed February 14, 1931, Serial No. 518,857, filed February 27, 1931, and Serial No. 526,378, filed March 30, 1931.

The mechanisms suggested by these prior applications are designed to so control the clutch engaging operation of a power means as to simulate the conventional manual operation of the clutch. However, difficulty is still encountered in providing a smooth engagement of the clutch during the gear shifting operation. It is therefore the principal object of the invention to provide a power operated clutch control means insuring a substantially perfect clutch engagement by permitting the driving and driven elements of the clutch to move into driving engagement only when and if the elements are rotating at the same speed. All undesirable grabbing of the clutch and jerking of the vehicle is thus eliminated.

A further object of this invention is to provide means for effecting two distinct stages of movement of the clutch, the first stage being controlled by the power element of the operating means and the second stage being controlled by governor means operable by the driving and driven elements of the clutch.

Another object of this invention is to provide in an automatic clutch control means certain mechanism whereby the clutch is allowed to move up to its engaging position at a relatively rapid rate, and then to complete its movement to engage the clutch only when the clutch elements are rotating at the same or substantially the same speed.

A further object of the invention is to provide an intake manifold vacuum operated power means for operating a clutch, said power means being controlled by valvular means operated jointly by the accelerator, the power element of the power means and a governor mechanism, the latter being operative to effect the engagement of the clutch only when and if the driving and driven elements of the clutch are rotating at the same or substantially the same speed.

Other objects of the invention and desirable details of construction and combinations of parts will become apparent from a detailed description of certain embodiments of the invention, described in detail in the following specification taken in conjunction with the accompanying drawings illustrating said embodiments, in which:

Figure 1 is a side elevation, with portions in longitudinal and vertical section, of an automobile equipped with one form of my power operated clutch controlling mechanism; and Figure 2 is a view similar to Figure 1 showing a modified form of control.

Referring more particularly to the drawings, numeral 10 indicates the usual conventional internal-combustion engine of an automobile having an intake manifold 11 to which is secured a pipe 12 which is connected to a valve casing 13, which valve casing has slidably mounted therein a piston having portions 14 and 15 in slidable engagement with the interior portion 16 of the valve housing, and this valve housing is closed by a suitable plug 17 at one end.

A compression spring 18 surrounds a valve stem 19 between the portion 14 and the plug 17, and said valve stem extends in a slidable manner through plug 17 and has a stop 20 adjustably secured thereon against which is adapted to normally press a lever 21 which is secured on accelerator rod 22, which accelerator rod 22 has a lug 23 extending upwardly therefrom in which one end of a tension spring 24 is mounted, the other end of said spring being secured as at 25 to any suitable portion of the automobile or to the internal-combustion engine as shown.

The accelerator rod 22 has a treadle portion 26 thereon which is adapted to be depressed by the foot of the driver of the automobile. The accelerator rod has secured on the other end thereof an extension 27 having a slot 28 therein engaging a pin 29 attached to a throttle lever 30 whereby the valve stem 19 is allowed to be moved by spring 18 before the carburetor is actuated. Such a construction insures a complete operation of the valve either before or after the throttle is opened or closed. Pipes 32 and 33 are secured to the other side of valve housing 13, and in the closed end of valve housing 13 there is provided a vent port 34.

Pipe 32 leads to a valve casing 36 which has slidably mounted therein a piston 37 having a stem 38 connected to one end thereof, said stem at one end penetrating one end of the valve housing 36 and at its other end passing through floor-board 39 of the automobile. A spring 40, secured to an enlarged portion on the end of the stem, is adapted to force notch 41 into engagement with a dog 42 to hold the parts in the position shown, but in case it is desired to slide piston 37 downwardly a forward pressure on rod 38 and then a downward pressure will cause the rod 38 to be relieved from dog 42. The stem 38 is also provided with a second notch 41' to retain the stem in its lower position. Valve housing 36 has a vent 43 which is normally closed by piston 37. In its lowermost position the valve 37 thus cuts off communication between the manifold and a cylinder 50 and permanently vents the cylinder to render the same inoperative to control the clutch.

Also connected to valve housing 36 is a pipe 44 which communicates with the closed end of the cylinder. The cylinder has mounted therein a piston 51 to which is connected a piston rod 52 which slidably penetrates a closure 53 secured over the open end of cylinder 50, said closure having perforations 54 therein to expose the open end of cylinder 50 to atmospheric pressure. The rod 52 has mounted thereon a compression return spring 55 which is held in position at its other end by means of an adjustable collar 56 on rod 52.

Rod 52 has a coupling 57 threadedly secured on the left-hand end thereof, as viewed in Figure 1, and an eye member 58 having a slot 59 therein is threadedly secured to the other end of coupling 57. The other end of eye member 58 has threadably secured therein a valve stem 60 which is connected to a bleed valve member having pistons 61 and 62 slidably mounted within a valve housing 63, said valve housing having a pipe 64 on one side thereof and a pipe 65 connected to the other side thereof and having a vent 66 in its closed end, a plug 67 in its open end slidably receiving the rod 60. Pipe 65 is connected to a T 69 to which is connected a pipe 70 as well as pipe 33.

Pivotally mounted on a shaft 72 projecting through the transmission housing of the engine is a lever 71 which has a pin 73 projecting through slot 59. A pin 75, mounted in lever 71, has secured thereto a link 76 which has a slot 77 in the other end thereof in which a pin 78 on a clutch pedal 79 is adapted to have movement. The clutch pedal is pivotally mounted as at 80, and a tension clutch engaging spring 81 is adapted to pull the lower end of the clutch pedal to the left, shown in Figure 1.

Shaft 72 projects into transmission housing 74 and has a lever 71ᵃ secured thereon, the upper forked end of which lever engages circumferential groove 100 in the hub of a driven clutch disk 98.

The transmission housing is of slightly unconventional design and has a casing with a top 82 and a side portion 83 to house a governor mechanism. The governor mechanism is operably connected to a driving member 84 of the clutch, said member being fixedly mounted on the crank shaft 85 of the engine. A pinion 86 on the shaft meshes with a bevel gear 87 secured on the lower end of a shaft 88, which shaft at its lower end is mounted in a bearing in a bracket 89. A centrifugal fly-ball governor 90 is mounted on the upper end of shaft 88. A projection 91, secured to the governor, is adapted to receive the forked end 92 of lever 93, pivoted at 94 and having an upwardly projecting arm 95. The upper end of shaft 88 is mounted in a bearing 96.

The transmission shaft 97 of the automobile has slidably and non-rotatably mounted thereon a driven clutch element 98, a friction disc 99 being interposed between the clutch elements. The driven clutch element 98 has a circumferential groove 100 therein in which a forked upper end of lever 71ᵃ is adapted to have engaging movement.

A tension spring 101 is mounted between the hub portion of element 98 and a pinion 102, the latter being fixedly secured on the shaft 97, said pinion meshing with a bevel gear 103 mounted on the lower end of a shaft 104, the upper and lower ends of which shaft are mounted in bearing brackets 105 and 105' respectively. A fly-ball governor 106 is mounted on the upper end of shaft 104 with the other forked end of lever 93 engaging a projection 107 secured to the governor.

The upper end of arm 95 engages a valve stem 110 which has thereon two pistons 111, 112, a set screw 113 being provided for limiting the movement of said pistons. The pistons are reciprocable in a valve casing 113', a conduit 70 being connected to one side thereof and a conduit 114 connected to the other side thereof. Inasmuch as the aforementioned valve mechanism controls the return of air to the cylinder 50 to control the engagement of the clutch, said mechanism may be properly termed a bleed valve.

The above-described mechanism is designed to control the engagement of the clutch only when the vehicle is in motion; therefore, the engagement of the clutch is controlled manually to get the vehicle under way, the control valve 37 at this time being depressed to vent the cylinder 50. The valve 37 is, of course, moved upwardly to reconnect the cylinder with the conduit 32 after the car is in motion and thus render the clutch control mechanism operative.

With the vehicle in motion and in low gear, upon release of the accelerator to shift into second the valve 14, 15 is moved to the right to intercommunicate conduits 12 and 32. By virtue of the manifold vacuum existing at this time the cylinder 50 is evacuated to move the piston 51 to the right and disengage the clutch. This movement of the piston also moves bleed valve piston 61, 62 to interconnect conduits 64 and 65. With the clutch disengaged the speed of the motor drops down to its idling speed, whereupon the governor 90 is barely operated. At this time the governor 106 is operative by virtue of the speed of the driven shaft 97 to move the arm 95 and its connected valve 111, 112 to the left, all as disclosed in Figure 1, to thus cut off communication between the conduits 70 and 114. After shifting to second gear, the accelerator is depressed, the valve 14, 15 cutting off the connection between conduits 12 and 32 and intercommunicating interconnecting conduits 32 and 33. Air then rushes, via pipe 64, valve 61, 62 pipe 65 and conduits 33 and 70, into the cylinder 50, which will be defined in the claims as an actuator, permitting the relatively rapid movement of the clutch until valve 61 moves sufficiently to the left to close off communication between conduits 64 and 65. The parts are so adjusted that at this time the clutch plates are just about to contact. Upon speeding up the engine so that the shafts 85 and 97 are rotating at the same speed the governor 90 will function to move the bleed valve 111, 112 to the right to interconnect conduits 70 and 114, and by virtue of the relatively large intake of air through 114 the movement of the piston 51 is completed to thus effect the driving engagement of the clutch, the size of the ducts being such as to insure this movement before the occurrence of any substantial change in the relative speeds of the shafts 85 and 97.

The aforementioned cycle is repeated in shifting from second to high gear. There is thus provided means for effecting a two-stage engagement of the clutch, the engagement being initiated by the control of a master valve 14, 15 controlled from the accelerator, the second stage of clutch movement being initiated only when and if the driving and driven elements of the clutch are rotating at the same or substantially the same speed. The usual grabbing and jerking of the clutch resulting from an improper manual operation thereof, or possibly an improper power operation thereof, in heretofore suggested devices is thus obviated, for the clutch may only be engaged when the elements thereof are rotating at the same speed. The shock incident to the engagement is a negligible factor and has no undesirable effect.

In the structure shown in Figure 2 the numeral 210 indicates the usual conventional internal-combustion engine of an automobile having an intake manifold 211 to which is secured a conduit 212 connected to a valve casing 213. The valve casing has slidably mounted therein a piston having the portions 214 and 215 in slidable engagement with the interior portion 216 of the valve housing, and this valve housing is closed by a suitable plug 217 at one end.

A compression spring 218 surrounds a valve stem 219 between the portion 214 and the plug 217, and said valve stem extends in a slidable manner through plug 217 and is provided with a collar 220 adjustably secured thereon against which is adapted to nominally press an arm 221 which is secured on accelerator rod 222. The accelerator rod 222 has a lug 223 extending upwardly therefrom to which one end of a tension spring 224 is mounted, the other end of said tension spring being secured as at 225 to any suitable portion of the automobile or to the internal-combustion engine as shown.

The accelerator rod 222 has a treadle member 226 thereon which is adapted to be depressed by the foot of the driver of the automobile. The accelerator rod has secured on the other end thereof an extension 227 having a slot 228 therein engaging a pin 229 attached to the throttle lever, whereby the valve stem 219 is allowed to be moved by spring 218 before the throttle is actuated. Pipes 232 and 233 are secured to the other side of the valve casing 213, and in the closed end of the housing there is provided a vent port 234.

Pipe 232 leads to a valve casing 236 which has slidably mounted therein a piston 237 having a stem 238 connected to one end thereof, extending through one end of the valve housing 236 and passing through the floorboard 239 of the automobile. A spring 240 is secured to an enlarged end of the stem 238, which forces notches 241 and 241' into engagement with a dog 242 to hold the parts in the position shown, but in case it is desired to slide piston 237 downwardly a forward pressure on rod 238 and then a downward pressure will cause the rod 238 to be relieved from dog 242. Valve housing 236 has a vent 243 which is normally closed by piston 237. This permits the vacuum to be broken in cylinder 250 when desired without accelerating the engine.

Also connected to valve housing 236 is a pipe 244 which communicates with the closed end of a cylinder 250. Cylinder 250 has mounted therein a piston 251 to which is connected a piston rod 252 which slidably penetrates a cap 253 secured over the open end of cylinder 250, said cap 253 having perforations 254 therein to expose the open end of cylinder 250 to atmospheric pressure. Rod 252 has mounted thereon a compression spring 255 which is held in position at its other end by means of an adjustable collar 256 on rod 252.

Rod 252 has a coupling 257 threadably secured on the left-hand end thereof, and an eye member 258 having a slot 259 therein is threadably secured to the other end of coupling 257. The other end of eye member 258 has threadably secured therein a valve stem 260 which is connected to a valve having pistons 261 and 262 slidably mounted within a valve housing 263, said valve housing having a pipe 264 on one side thereof and a pipe 265 connected to the other side thereof and having a vent 266 in its closed end and a plug 267 in its open end through which rod 260 slidably penetrates. Pipe 265 is connected to a T 269 to which is connected a pipe 270 as well as pipe 233.

Pivotally mounted on the shaft 272 in the transmission housing of the engine is a lever 271. A pin 275 mounted in lever 271 has secured thereto a link 276 which has a slot 277 in the other end thereof in which a pin 278 on clutch pedal 279 is adapted to have movement. The clutch pedal 279 is pivotally mounted as at 280, and a tension spring 281 is adapted to pull the lower end of the clutch pedal 279 to the left as shown in Figure 2.

Shaft 272 projects into transmission casing 274 and has a lever 271a secured thereon, the upper forked end of which lever engages circumferential groove 300 in the hub of clutch disk 298.

The transmission casing 274 is of slightly different design from the conventional design and has a casing with a top 282 and a side portion 283 to house the governing mechanism. The governing mechanism comprises the portion 284 of a clutch which is fixedly mounted on the crank shaft 285 of the engine, the crank shaft having a pinion gear 286 thereon meshing with a bevel gear 287 secured on the lower end of the shaft 288, which shaft at its lower end is mounted in a bearing in a bracket 289 and has a centrifugal pump 290 mounted thereon.

The transmission shaft 297 of the automobile has slidably mounted thereon the other portion 298 of the clutch with the intermediate disk 299 between the portions 284 and 298 of the clutch. This portion 298 has a circumferential groove 300 in which the forked upper end of lever 271a is adapted to have engaging movement.

A tension spring 301 is mounted between the hub portion of portion 298 and the pinion gear 302, which is fixedly secured on differential shaft 297, and this pinion gear 302 meshes with a bevel gear 303 mounted on the lower end of shaft 304, the lower end of which shaft is mounted in a bearing bracket 305, and a centrifugal pump 307 is mounted on the upper end of shaft 304.

Shaft 288 has on the upper end thereof a centrifugal pump casing 290 which has a conventional impeller mounted therein, which is not shown but which is of conventional design, and a pipe 290a leads from one side of the pump 290 into the oil in the lower part of casing 274 and from the other side of pump 290 leads a pipe 291 which has a leak valve 292 therein adapted to allow the oil to leak from pipe 291 when a predetermined amount of pressure has been built up in pipe 291. The pipe 291 leads into housing 293 in which is mounted a compression spring 294, and in which housing is slidably mounted one end of piston 295. Piston 295 has thereon an arm 296 which is secured to valve stem 310. Arm 296 is mounted within a casing 320, which also supports valve casing 306.

Shaft 304 has a similar centrifugal pump 307 on the upper end thereof having a pipe 308 leading from one side thereof into the oil casing 274, and a pipe 309 leads from the other side of this pump 307 and has a vent valve 321 therein. Said pipe 309 leads to a casing 322 in which the other end of piston 295 is slidably mounted, and a compression spring 323 is mounted in said casing, which casing has therein a port 324 registering with pipe 309.

Pipes 291 and 309 have vents 291a and 309a therein so oil can escape slowly at all times, so that when pressure is built up on the end of piston 295 this slow leakage will allow the piston to move in either direction.

The upper end of arm 296 engages valve stem 310 which has thereon two pistons 311 and 312, a set screw 313 being provided to limit the movement of said pistons. The pistons are reciprocable in the valve casing 306, a conduit 270 being connected to one side thereof and a conduit 314 being connected to the other side.

The operation of the structure shown in Figure 2 is substantially the same as that of the governor mechanism, which in the modification of Figure 2 is fluid operated in lieu of the mechanically operated governors of Figure 1. As with the structure of Figure 1, when the clutch elements are rotating at the same or substantially the same speed, the fluid pressures acting on the piston of the governor mechanism act to open up the venting conduits to rapidly complete the engagement of the clutch.

It will be understood that while the illustrated embodiments of the invention are described as shown, a considerable latitude is to be permitted in construction within the scope of the appended claims.

I claim:

1. Clutch control mechanism for an automotive vehicle provided with a clutch having driving and driven elements and yieldable means normally operative to force said elements into driving engagement one with another and comprising in combination therewith governor mechanism operably connected to said elements, power means operatively connected to the driven clutch element by positive mechanical means, and valvular means for controlling the operation of said power means to control the engagement and disengagement of the clutch, said valvular means being operable to effect two distinct stages of clutch engaging operation of said power means, the operation of the valvular means to initiate the second stage being effected by the governor means when the clutch elements are rotating at the same or substantially the same speed.

2. Clutch control mechanism for an automotive vehicle provided with a clutch having driving and driven elements comprising governor mechanism operably connected to said elements, pressure differential operated power means operably connected to the driven clutch element, and valvular means including a separate three-way valve and bleed valve means, for controlling the operation of said power means to control the engagement and disengagement of the clutch, said bleed valve means being operable in part through the intermediary of said governor means to effect a complete clutch engaging operation of said power means only when the driving element of the clutch is rotating at the same or substantially the same speed as the driven element of the clutch said bleed valve means also being operable by other means.

3. Clutch control mechanism for an automotive vehicle provided with a clutch having driving and driven elements comprising speed-responsive mechanism connected to said elements and operable thereby, vacuum operated power means operably connected to the clutch, and valvular means for controlling the degree of gaseous pressure within the suction compartment of said power means to effect both the disengagement and engagement of the clutch, said valvular means comprising means, operable by the power element of the power means, for limiting the gaseous pressure to a predetermined factor to interrupt the engagement of the clutch just prior to the contacting of the clutch elements, and further comprising other means, operable by said speed-responsive mechanism, to initiate and complete the driving engagement of the clutch elements when and if said elements are rotating at the same or substantially the same speed.

4. Clutch control mechanism for an automotive vehicle provided with a clutch comprising, in combination, governor means operably connected to the clutch, a power actuator having a power element operably connected to the driven element of the clutch, and valvular means for controlling the operation of the actuator comprising three separate valves, one operable to selectively interconnect the actuator with either a source of power or with the other two valves, one of said latter valves being operated by the aforementioned power element and the other of said valves being operated by the governor means.

5. In an automotive vehicle provided with an internal-combustion engine, a throttle controlling accelerator and a clutch having driving and driven elements, power means for operating the clutch comprising a cylinder, a reciprocable power element within the cylinder operably connected to the driven clutch element, a fluid transmitting conduit interconnecting the manifold and cylinder, a master valve member incorporated in said conduit, means connecting said valve member and accelerator, a second conduit connected to said valve member, two separate conduits each connected to said second conduit and a control valve incorporated in each of said last-mentioned conduits.

6. In an automotive vehicle provided with an internal-combustion engine, a throttle controlling accelerator and a clutch having driving and driven elements, power means for operating the clutch comprising a cylinder, a reciprocable power element within the cylinder operably connected to the driven clutch element, a fluid transmitting conduit interconnecting the manifold and cylinder, a master valve member incorporated in said conduit, means connecting said valve member and accelerator, a second conduit connected to said valve member, two separate conduits each connected to said second conduit, a control valve incorporated in each of said last-mentioned conduits, means operable by said power element for operating one of said last-mentioned valves and speed-responsive means for operating the other of said last-mentioned valves.

7. Clutch control mechanism for an automotive vehicle provided with an intake manifold, an accelerator and a clutch having driving and driven members, a power actuator operably connected to the driven element of the clutch, a governor mechanism operably connected to said clutch elements, valve means for controlling the operation of said power actuator, said means being jointly controlled by the accelerator, the governor means and the actuator, together with fluid transmitting connections interconnecting said manifold, actuator and valve means.

8. Clutch control mechanism for an automotive vehicle provided with an intake manifold, an accelerator and a clutch having driving and driven members, a power actuator operably connected to the driven element of the clutch, a governor mechanism operably connected to said clutch elements, valve means for controlling the operation of said power actuator, said means being jointly controlled by the accelerator, the governor means and the actuator, together with a manually operable cut-out means for rendering the actuator inoperative when the vehicle is static.

9. Clutch control mechanism for an automotive vehicle provided with a clutch having driving and driven elements, pressure differential operated power means for operating the driven clutch element to control the engagement and disengagement of the clutch, and automatically operable means for controlling the clutch engaging operation of said power means comprising a clutch driving element operated governor, a clutch driven element operated governor, and bleed valve means operable in part by said governors and operative when the clutch elements are rotating at the same or substantially the same speed to permit a driving engagement of the clutch elements, said bleed valve means comprising two separate valve members, one of which is operably connected to the driven clutch element.

10. Clutch control mechanism for an automotive vehicle provided with a clutch having driving and driven elements, power means for operating the driven clutch element to control the engagement and disengagement of the clutch, said power means including a valve operable to initiate the clutch disengaging and engaging operations of said means and further comprising automatically operable means for controlling the clutch engaging operation of said power means comprising a fluid pump drivably connected to the driving element of the clutch, a second fluid pump drivably connected to the driven element of the clutch, and fluid operated bleed valve means controlled in part by said pumps for effecting a driving engagement of the clutch elements only when and if the clutch elements are rotating at the same or substantially the same speed said bleed valve means comprising two separate valve members, one of which is operably connected to the driven clutch element.

HENRY L. PIKE.